(12) United States Patent
Sullivan et al.

(10) Patent No.: US 9,660,435 B2
(45) Date of Patent: May 23, 2017

(54) MULTI-DIRECTIONAL ELECTRICAL POWER PROTECTION SYSTEM

(75) Inventors: Christopher P. Sullivan, Bridgeport, CT (US); Mark P. Eisenhauer, Milford, CT (US); Raymond Andrew Loch, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1198 days.

(21) Appl. No.: 13/332,927

(22) Filed: Dec. 21, 2011

(65) Prior Publication Data

US 2013/0162035 A1    Jun. 27, 2013

(51) Int. Cl.
*H02H 3/08*      (2006.01)
*H02H 7/26*      (2006.01)
*H02H 7/28*      (2006.01)

(52) U.S. Cl.
CPC .......... *H02H 3/081* (2013.01); *H02H 7/261* (2013.01); *H02H 7/28* (2013.01); *Y10T 307/305* (2015.04)

(58) Field of Classification Search
CPC ........................................................ H02J 1/00
USPC .............................................. 307/44, 29, 18
See application file for complete search history.

(56) References Cited

U.S. PATENT DOCUMENTS

| | | | |
|---|---|---|---|
| 4,321,645 A | 3/1982 | Thom et al. | |
| 4,659,942 A | 4/1987 | Volp | |
| 5,305,174 A | 4/1994 | Morita et al. | |
| 5,386,147 A * | 1/1995 | Bonneau ................... | H02J 3/38 307/64 |
| 5,654,859 A * | 8/1997 | Shi ............................ | H02J 9/00 361/100 |
| 5,686,766 A * | 11/1997 | Tamechika .............. | F03D 9/003 307/31 |
| 5,751,524 A | 5/1998 | Swindler | |
| 6,307,723 B1 | 10/2001 | Hindle et al. | |
| 6,344,700 B1 | 2/2002 | Eisenhauer et al. | |
| 7,005,833 B2 | 2/2006 | Adams | |
| 7,525,782 B1 | 4/2009 | Hedrick et al. | |

(Continued)

FOREIGN PATENT DOCUMENTS

| EP | 2442417 A1 | 4/2012 |
|---|---|---|
| GB | 521074 A | 5/1940 |

OTHER PUBLICATIONS

European Search Report for Application No. 12195679.1, mailed Apr. 15, 2013, 7 pages.

*Primary Examiner* — Rexford Barnie
*Assistant Examiner* — Daniel Kessie
(74) *Attorney, Agent, or Firm* — Cantor Colburn LLP

(57) ABSTRACT

A multidirectional electrical power protection system, includes a first power supply and at least a second power supply with each supply being configured for supplying power to a main bus circuit; a first load bus electrically connected to the first power supply and at least the second power supply, at least a second load bus electrically coupled with each of the first power supply and at least the second power supply, the first load bus and the second load bus configured for energizing devices connected to the respective first and second load bus; and at least one smart contactor in coupled with the main bus circuit, the at least one smart contactor being configured for sensing a first current flowing in a first direction through the main bus circuit and for sensing a second current flowing in a second direction through the main bus circuit.

16 Claims, 3 Drawing Sheets

(56) References Cited

U.S. PATENT DOCUMENTS

| | | |
|---|---|---|
| 7,936,086 B2 | 5/2011 | Yue et al. |
| 8,014,115 B2 * | 9/2011 | Vicente .................... H02H 7/30 361/93.1 |
| 8,344,544 B2 * | 1/2013 | Rozman .................... H02J 1/10 307/29 |
| 2002/0105764 A1 * | 8/2002 | Bax ........................ H02H 3/347 361/42 |
| 2008/0204961 A1 | 8/2008 | O'Leary et al. |
| 2009/0257157 A1 * | 10/2009 | Vicente .................... H02H 7/30 361/42 |
| 2010/0008000 A1 | 1/2010 | Riley et al. |
| 2011/0018341 A1 * | 1/2011 | Jacobson ................. H02H 7/22 307/12 |
| 2011/0093234 A1 * | 4/2011 | Williams ............. H01H 47/002 702/115 |

\* cited by examiner

MULTI-DIRECTIONAL ELECTRICAL POWER PROTECTION SYSTEM

FIELD OF INVENTION

The subject matter disclosed herein relates generally to the field of a ground fault protection circuit and, particularly, to a ground fault protection circuit for a multi-supply electrical distribution system having multiple load buses.

DESCRIPTION OF RELATED ART

Ground fault protection ("GFP") circuits are commonly used for providing automatic circuit interruption upon detection of undesired short circuit currents which flow as a result of a ground fault condition in electrical power distribution systems. Such GFP circuits ordinarily sense and individually isolate any faults occurring in a respective branch circuit of the power distribution systems, and utilize selective coordination to instantly respond and interrupt power only to the system area where a fault occurs thereby preventing unnecessary loss of power to other areas. GFP circuits of this type are quite effective in single supply electrical distribution systems where only one circuit breaker is required to trip and clear the fault. However, as modern power distribution systems become increasingly complex and use multiple power supplies and current paths, such systems require added circuit breakers for adequate circuit protection. More complex ground fault protection circuits are consequently required.

Yet other types of GFP circuits utilize secondary circuits in order to accommodate multiple power supplies. Such circuits utilize a secondary circuit for routing tripping currents to ground fault relays for causing designated circuit breakers to trip thereby interrupting power only to the portion of the primary circuit which has a ground fault. But, a disadvantage to these protective circuits is the difficulty of coordinating the specific circuit breaker to be tripped that is associated with the fault. This causes more circuit breakers to trip during a ground fault than is required, thereby causing more loads to lose power than is necessary.

BRIEF SUMMARY

According to one aspect of the invention, a multidirectional electrical power protection system includes a first power supply configured for supplying power to a main bus circuit; at least a second power supply configured for supplying power to the main bus circuit; a first load bus electrically connected to each of the first power supply and at least the second power supply, the first load bus configured for energizing at least a first device connected to the first load bus; at least a second load bus electrically connected to each of the first power supply and at least the second power supply, the second load bus configured for energizing at least a second device connected to the second load bus; and at least one smart contactor in connected to the main bus circuit, the at least one smart contactor being configured for sensing a first current flowing in a first direction through the main bus circuit and for sensing a second current flowing in a second direction through the main bus circuit.

According to another aspect of the invention, a method of automatically detecting a ground fault in a multidirectional electrical power protection system includes supplying power, via a first power supply, to a main bus circuit; supplying power, via at least a second power supply, to the main bus circuit; energizing a first load bus and at least a second load bus, the first and at least the second load buses electrically connected to each of the first power supply and at least the second power supply; sensing, via at least one smart contactor, a first current flowing in a first direction through the main bus circuit and for sensing a second current flowing in a second direction through the main bus circuit, the at least one smart contactor being electrically connected to the main bus circuit; and delivering, via logic control, an output signal in response to the sensing of an overcurrent flowing in either of the first or the second directions.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a multi-directional power protection system for an aircraft or an electrical power distribution grid includes a plurality of power supplies connected to smart contactors having logic control for sensing a fault condition in a power supply or in a branch of a circuit within the system. The system includes load buses connected to the plurality of power supplies so that the same power and signal lines are shared by all the power supplies. The system includes a tiered current protection arrangement for sensing multi-directional currents flowing in the system and selectively disconnecting one or more load buses or a power supply associated with a fault condition based on the direction of current flowing through the logic control unit. The smart contactors and their respective logic controls disconnect the load bus or the power supply associated with the fault condition in order to minimize the adverse effect of the operation of other load buses in the system. In embodiments, the smart contactors use bidirectional current protection devices and logic contactors to implement the current protection properties of the system utilizing one of power supplies to supply power to the load buses.

Figure 1:
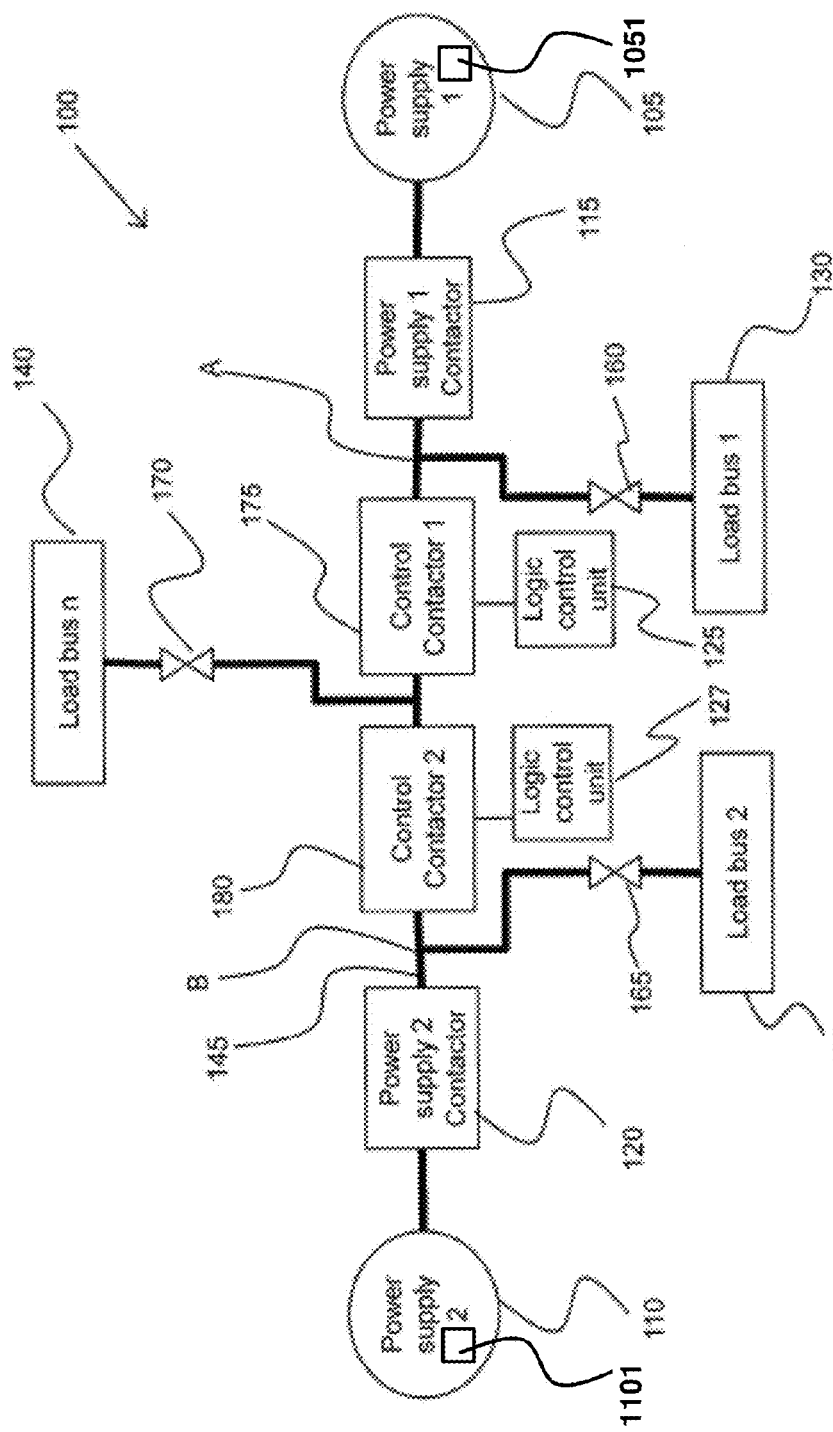
FIG. 1 illustrates a schematic block diagram of the multi-directional electrical power protection system according to an embodiment of the invention.

Referring now to the drawings, FIG. 1 illustrates a schematic block diagram of a multi-directional electrical power protection system 100 according to an embodiment of the invention. Particularly, the power protection system 100 includes a plurality of power supplies 105, 110 connected in parallel to a main bus circuit 145. In embodiments, additional power supplies substantially similar to power supply 105 may be connected to the system 100 without departing from the scope of the invention. The power supplies 105, 110 supply electrical power to the main bus circuit 145, which are respectively connected to the main bus circuit 145 through power supply contactors 115, 120 respectively. For example, the main bus circuit 145 includes a power supply 105 electrically connected to a power supply contactor 115 while the power supply 110 is electrically connected to power supply contactor 120. In some non-limiting examples, the power supplies 105, 110 may be a DC battery, DC Generators, or AC supplies including transformers, and are rated to provide 28 VDC, 600 Amperes to the main bus circuit 145. In other embodiments, the power supplies 105, 110 may be three-phase AC supplies having grounded-neutral transformers for providing three-phase power to the main bus circuit 145. In one example, the power supplies 105, 110 include respective Generator Control Units (GCU) 1051, 1101 that regulate the power supplies 105, 110 voltages and controls the power supply contactors 115, 120 including disconnecting the respective power supply contactors 115, 120. Each of the power supply contactors 115, 120 includes an overvoltage sensing circuit that regulates the output voltage being supplied by respective power supplies 105, 110, and continually monitors the output voltage being supplied including disconnecting either of the power supplies 105, 110 from the main bus circuit 145 if the voltages or currents exceeds a preset level. Additionally, the power supply contactors 115, 120 are programmed to trip when current values exceed a predetermined current value for a predetermined time. In an embodiment, the power supply contactors are rated to open for currents above 150 Amperes.

Also shown in FIG. 1, the power protection system 100 includes smart contactors 175, 180 having individual logic controls 125, 127, which are electrically connected to the power supplies 105, 110 and load buses 130, 135, 140. In an embodiment, load buses 130, 135, 140 are provided with respective electrical fuses such as, for example, current limiting devices 160, 165, 170 or another thermal "trip" device for providing additional fault protection on each of the load buses 130, 135, 140. In an embodiment, the current limiting device is an 80 Ampere fuse or thermal device, which is rated to "open" or "trip" at a predetermined $I^2t$ rating (i.e., a time-current thermal value or "trip curve"). Also, smart contactors 175, 180 including their respective logic controls 125, 127 are interconnected to the main bus circuit 145 and are connected at a node between load buses 130, 135, 140. In an embodiment, the smart contactor 175 is connected at node A, which is located between the load buses 130, 140, while smart contactor 180 is connected at node B, which is located between the load buses 135, 140. The location of the smart contactors 175, 180 with their logic controls 125, 127 provides a multi-tiered current protection scheme to cause a load on a particular bus to switch to an alternate power supply in the event of a primary power supply failure. In other embodiments, a single logic control unit which includes circuitry found in smart contactors 175, 180 and logic control units 125, 127 may be provided for providing the multi-tiered current protection scheme in lieu of smart contactors 175, 180.

In one non-limiting embodiment, independent "smart" contactors 175, 180 having hall-effect sensors (not shown) are connected to the main bus circuit 145 for monitoring the bidirectional current values traversing through the respective smart contactor's individual logic controls 125, 127. In one example, logic control for smart contactors 175, 180 may include discrete components and circuit design utilizing capacitors, "bleed" and "trip" resistors to produce the $I^2t$ current trip curves and execute algorithms related to a particular trip curve for multi-directional current flowing through the smart contactors 175, 180. In another non-limiting example, logic control for the smart contactors 175, 180 include a microprocessor associated with each logic controls 125, 127 having preprogrammed commands stored in nonvolatile memory for executing algorithms related to a particular trip curve for multi-directional current flowing through the smart contactors 175, 180. In embodiments, the smart contactors 175, 180 are programmed for tripping when current flowing in a particular direction exceeds a predetermined current value stored for that particular direction (i.e., exceeds it trip curve for the particular direction). The logic control 125, 127 in each contactor 175, 180 is programmed to open the smart contactors 175, 180 and interrupt the current flowing to any of the load bus 130, 135, 140 measured current values that are in excess of the predetermined current value such as, for example, in the event of a ground fault or loss of any power supply 105, 110. In operation, respective smart contactors 175, 180 will apply DC power to the coils of the smart contactors 175, 180, thereby closing the contactor's coil to close the contacts and supply current to the load buses 130, 135, 140. The individual currents are measured by the current sensing-circuits utilizing, in one example, hall-effect sensors, which are transmitted to the logic control 125, 127 in smart contactors 175, 180. The logic controls 125, 127 in respective smart contactors 175, 180 use the current measurement information to determine whether to open the contacts and interrupt the current to any of the load buses 130, 135, 140 in order to protect system wiring or devices connected to the buses 130, 135, 140. To perform this fault protection, the logic control 125, 127 executes algorithms related to the trip curve characteristics of the smart contactors 175, 180 for opening a respective smart contactor 175, 180 and "tripping" the connection to a power supply for the particular direction of current that exceeds the $I^2t$ rating while still providing power from the other power supply with minimal interruption to the other load buses in the system 100. It is to be appreciated that while only two power supplies 105, 110 are shown in electrical communication to the load buses 130, 135, 140, additional power supplies or additional load buses may be connected to the main circuit bus 145 without departing from the scope of the invention.

Figure 2:
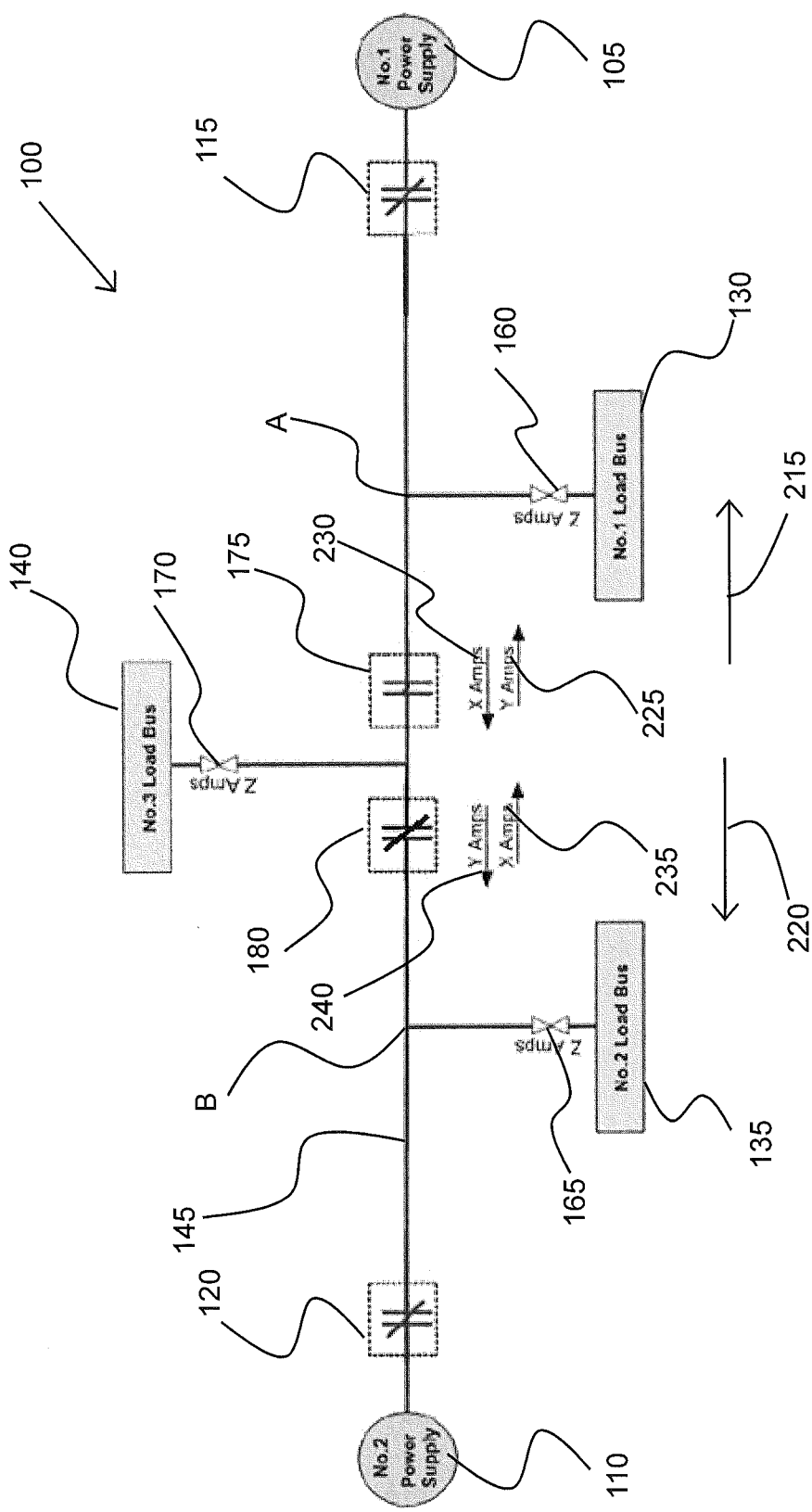
FIG. 2 illustrates a schematic block diagram of an algorithm used to isolate a fault or route power to a load bus from an alternate power supply according to an embodiment of the invention.

FIG. 2 illustrates a functional block diagram showing the algorithm utilized by the logic control unit for providing a multi-tiered current protection scheme according to an embodiment of the invention. In an embodiment, logic control unit 125 (FIG. 1) includes smart contactors 175, 180 having hall-effect sensors that are electrically connected to the main bus circuit 145. Each smart contactor, such as smart contactors 175, 180, includes logic control 125, 127 (FIG. 1) for sensing current flowing in direction 215 and direction 220. Specifically, the smart contactor 205 stores trip curves related to predetermined current values for current 230 in direction 220 and current 225 in direction 215, and the microprocessor opens or trips the contactor 205 for currents exceeding these stored values. Also, smart contactor 180 stores trip curves for predetermined current values current 235 in direction 215 and current 240 in direction 220, and the logic control 127 (FIG. 1) opens or trips for currents exceeding the stored values. In an embodiment, current values 225 and 240 are 125 Amperes and current values 230 and 235 are 150 Amperes, although other current values may be selected without departing from the scope of the invention. Additionally, load buses 130, 135, 140 are provided with respective current limiting devices 160, 165, 170 (such as, for example a fuse or a thermal "trip" device) for providing additional fault protection on each of the load buses 130, 135, 140. In an embodiment, the current limiting device is an 80 Ampere fuse or thermal device, which is rated to "open" at a predetermined $I^2t$ trip curve.

In embodiments, the power supply contactors 115, 120 will energize the main bus circuit 145 by automatically connecting the power supply 110, 105 output to the main bus circuit 145 when the output voltage from each power supply 105, 110 has risen to a preset level. In response to an input command, each smart contactor 175, 180 will apply DC power to the contactor's coil to close the contactors 175, 180 and supply current to the load buses 130, 135, 140, thereby energizing one or more devices connected to the buses 130, 135, 140. As such, the smart contactors 175, 180 are normally closed when the main bus circuit 145 is energized. The smart contactors 175, 180 include circuitry for producing $I^2t$ current trip curves with a multi-tiered trip curve characteristics and sense current flowing in direction 215 and direction 220. Smart contactor 205 is programmed to open for currents exceeding 125 Amperes for current 225 in direction 215 and for currents exceeding 150 Amperes for current 230 in direction 220. Also, smart contactor 180 is executed algorithms through logic control 127 (FIG. 1) to open for current values exceeding 125 Amperes for current 240 in direction 220 and for currents exceeding 150 Amperes for current 235 in direction 215. In one embodiment, in the event of a ground fault on load bus 135, an excess ground current will flow from power supplies 105, 110 through the smart contactors 175, 180 and into the current limiting device 165 and the load bus 135. Current limiter 165 being rated at 80 Amperes, which is a smaller trip value than those of power supply contactors 115, 120 or smart contactors 175, 180, will open first to clear the ground fault and isolate the load bus 135 from the main circuit 145, thereby minimizing the loss of power to just the load bus 135 while protecting the power lines in the main circuit bus 145. In another embodiment, in the event of a fault at node A such as when there is a failure in the power supply 105, an excess ground current will flow through the main circuit bus 145 and into node B and the load bus 130. Since current 225 in direction 215 has a smaller trip time than current 235 in direction 215, smart contactor 175 will always open before the smart contactor 180 to clear the fault and isolate the power supply 105 from the main bus circuit 145. Isolating power supply 105 prevents loss of power to the load buses 135 and 140 as these load buses 135 and 140 switch into the other power supply 110.

Figure 3:
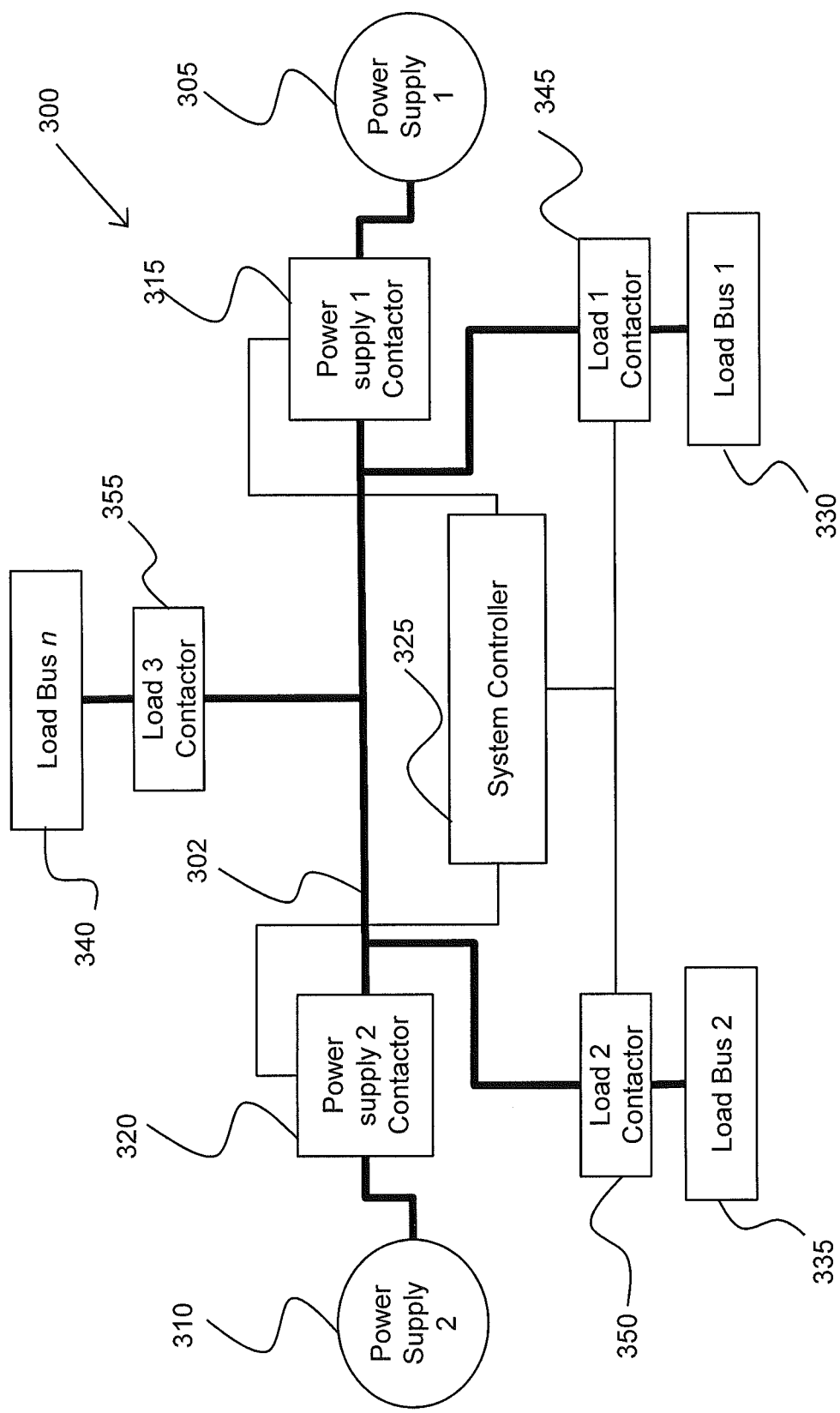
FIG. 3 illustrates a schematic block diagram of a multi-directional electrical power protection system according to another embodiment of the invention.

In an embodiment, illustrated in FIG. 3, a system controller 325 communicates with a main bus circuit 302 for executing algorithms for controlling the power supply contactors 315, 320 and load contactors 345, 350 and providing for a multi-tiered trip curve characteristics, while all other aspects remain substantially the same as those of system 100 which is shown and illustrated in FIG. 1. Particularly, system 300 includes the system controller 325 electrically connected to the power supplies 305, 310 and load buses 330, 335, 340 for monitoring the current values in main bus circuit 302. The system controller 325 receives current values measured by the sensors in the contactors 345, 350, 355 and selectively opens these contactors depending on the trip values programmed in the system controller 325. As such, the system controller 325 includes a microprocessor having preprogrammed commands stored in nonvolatile memory for executing algorithms related to a particular trip curves for multi-directional currents flowing through the contactors 345, 350, 355 and the main bus circuit 302. The microprocessor is programmed to open the smart contactors and interrupt the current flowing to any of the load buses 330, 335, 340 for measured current values that are in excess of the predetermined current value such as, for example, in the event of a ground fault or loss of any power supply 305, 310.

Also shown in FIG. 3, the power supplies 305, 310 supply electrical power to the main bus circuit 302, via power supply contactors 315, 320 respectively. For example, the main bus circuit 302 includes a power supply 305 electrically connected to a power supply contactor 315 while the power supply 310 is electrically connected to power supply contactor 320. In some non-limiting examples, the power supplies 305, 310 may be a DC battery, DC Generators, or AC supplies including transformers, and are rated to provide 28 VDC, 600 Amperes to the main bus circuit 302. In other embodiments, the power supplies 305, 310 may be three-phase AC supplies having grounded-neutral transformers for providing three-phase power to the main bus circuit 302. Each of the power supply contactors 315, 320 includes an overvoltage sensing circuit that regulates the output voltage being supplied by respective power supplies 305, 310, and are programmed to trip when current values exceed a predetermined current value for a predetermined time. In an embodiment, the power supply contactors are rated to open for currents exceeding 150 Amperes. It is to be appreciated that while only two power supplies 305, 310 are shown in electrical communication to the load buses 330, 335, 340, additional power supplies and additional load buses may be connected to the main circuit bus without departing from the scope of the invention.

The technical effects and benefits of exemplary embodiments include a multi-directional power protection system having a plurality of power supplies connected to smart contactors having logic control for sensing a fault condition in a power supply or in a branch of a circuit within the system. The system includes a tiered current protection scheme for sensing multi-directional currents flowing in the system and selectively disconnecting one or more load buses or a power supply associated with a fault condition based on the direction of current flowing through the logic control unit.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A multidirectional electrical power protection system, comprising:
   first and second power supplies configured for supplying power to a main bus circuit;
   first and second load buses electrically connected to each of the first and second power supplies via respective connections with the main bus circuit and configured for energizing at least first and second devices;
   first and second smart contactors connected in series to the main bus circuit between the respective connections of the first and second load buses with the main bus circuit and the first and second power supplies, each of the first and second smart contactors being configured for sensing a first current flowing in a first direction through the main bus circuit and for sensing a second current flowing in a second direction through the main bus circuit and respectively including first and second logic controls each in communication with a sensor for delivering an output signal for opening the corresponding one of the first and second smart contactors in response to the sensing of an overcurrent flowing in either of the first or the second directions via the sensor;

first and second power supply contactors electrically connected to the first and second power supplies in series with the connection of the first and second load buses with the main bus circuit and the first and second smart contactors, respectively, and an nth load bus with an absence of power supply or smart contactors electrically connected to each of the first and second power supplies via a connection with the main bus circuit between the first and second smart contactors.

2. The system of claim 1, wherein the overcurrent exceeds either the first current in the first direction or the second current in the second direction.

3. The system of claim 1, wherein the output signal is representative of a trip signal that correlates with a location of a ground fault in one of the power supplies or the load buses.

4. The system of claim 1, wherein the at least one smart contactor includes a first trip curve for the first current and a second trip curve for the second current.

5. The system of claim 4, wherein the first trip curve is dissimilar to the second trip curve.

6. The system of claim 4, further comprising a first electrical fuse coupled with the first load bus and a second electrical fuse coupled with at least the second load bus.

7. The system of claim 6, wherein the first and second electrical fuses include a third trip curve that is configured to open at a shorter time than the first and the second trip curves.

8. The system of claim 1, further comprising a first generator control unit for regulating the output voltage supplied by the first power supply.

9. The system of claim 1, further comprising a second generator control unit for regulating the output voltage supplied by the second power supply.

10. A method of automatically detecting a ground fault in a multidirectional electrical power protection system, comprising:

supplying power, via first and second power supplies, to a main bus circuit;

energizing first and second load buses electrically connected to each of the first and second power supplies;

connecting first and second smart contactors in series to the main bus circuit between respective connections of the first and second load buses with the main bus circuit and the first and second power supplies, connecting first and second power supply contactors to the first and second power supplies in series with the connection of the first and second load buses with the main bus circuit and the first and second smart contactors, respectively, and connecting an nth load bus with an absence of power supply or smart contactors to each of the first and second power supplies via a connection with the main bus circuit between the first and second smart contactors;

sensing, via the first and second smart contactors, a first current flowing in a first direction through the main bus circuit and a second current flowing in a second direction through the main bus circuit; and delivering, via first and second logic controls respectively included in the first and second smart contactors, an output signal for opening a corresponding one of the first and second smart contactors in response to the sensing of an overcurrent flowing in either of the first or the second directions.

11. The method of claim 10, wherein the overcurrent exceeds either the first current or the second current.

12. The method of claim 10, wherein the output signal is representative of a trip signal that correlates with a location of a ground fault in one of the first and second power supplies or the first and second load buses.

13. The method of claim 10, wherein the each of the first and second smart contactors includes a first trip curve for the first current and a second trip curve for the second current.

14. The method of claim 13, wherein the first trip curve is dissimilar to the second trip curve.

15. The method of claim 10, further comprising a first electrical fuse in signal communication with the first load bus and a second electrical fuse in signal communication with at least the second load bus.

16. The method of claim 15, wherein the first and second electrical fuses include a third trip curve that is configured to open at a shorter time than the first and the second trip curves.

* * * * *